United States Patent [19]

Trageser

[11] 4,043,196
[45] Aug. 23, 1977

[54] METHOD AND APPARATUS FOR EFFECTING FLUID FLOW MEASUREMENT IN A SINGLE SENSOR

[75] Inventor: James H. Trageser, Dayton, Ohio

[73] Assignee: Technology Incorporated, Dayton, Ohio

[21] Appl. No.: 656,183

[22] Filed: Feb. 9, 1976

[51] Int. Cl.² .............................................. G01F 1/68
[52] U.S. Cl. ..................................................... 73/204
[58] Field of Search ........................................ 73/204

[56] References Cited

U.S. PATENT DOCUMENTS

| | | | |
|---|---|---|---|
| 3,363,462 | 1/1968 | Sabin | 73/204 |
| 3,564,916 | 2/1971 | Collins et al. | 73/204 |

OTHER PUBLICATIONS

Runyan et al., "Emperical Method for Frequency Compensation for Idot Wire Anemometer", N.A.C.A. Tech. Note No. 1331, 6/47, pp. 1 and 2.

*Primary Examiner*—Herbert Goldstein
*Attorney, Agent, or Firm*—Jacox & Meckstroth

[57] ABSTRACT

A method and apparatus are disclosed for obtaining a very accurate mass flow rate for a fluid flowing in a conduit in accordance with the principles of King's Law. A single temperature sensitive resistive element is disposed within the fluid flow path. The temperature sensitive resistive element constitutes one leg of a resistor bridge across which the inputs of a differential amplifier are disposed. The output of the differential amplifier is employed as a feedback current source to the bridge in order to maintain the temperature sensitive resistive element at a constant temperature in the self-heating mode. Another leg of the bridge is rapidly switched back and forth before two different resistances such that the temperature sensitive resistive element correspondingly alternates between two different "constant" temperatures. The two voltage drops necessary to maintain the temperature sensitive resistive element at its corresponding two "constant" temperatures are repeatedly sampled, and calculations are performed to convert this information into power dissipation information by which King's Law may be applied to obtain mass flow rate and, if desired, the ambient temperature of the fluid flowing with the conduit.

11 Claims, 4 Drawing Figures

METHOD AND APPARATUS FOR EFFECTING FLUID FLOW MEASUREMENT IN A SINGLE SENSOR

FIELD OF THE INVENTION

This invention relates to the measuring arts and, more particularly, to the art of carrying out mass flow rate measurements of a fluid flowing in a conduit.

BACKGROUND OF THE INVENTION

Thermal techniques for the measurement of the mass flow rate of fluids generally fall into three catagories; viz: constant current, constant temperature, and boundary layer. With each technique, it has been the practice to employ two different sensors disposed in the fluid flow path and operating under different conditions from which the flow rate of the fluid may be calculated according to its cooling effect upon the sensors.

The constant current systems have been of either the thermistor type or the hot wire type. As is well known in the art, the prior art thermistor type is difficult to temperature compensate over a wide range of fluid temperature. At best, the temperature span is limited to approximately 50° C. The principal problem in obtaining a broad temperature range is the inability to match the resistance/temperature characteristics of the thermistor pair. This problem is accentuated when one sensor is self heated and the other is not. Calibration, in any event, must always be empirical due to many sensor variables. Linearization may be obtained only with hand-tailored functions due also to variables from sensor to sensor and to transfer function dependency upon several of the sensor variables. Transfer functions are usually necessarily in the form of a second or third order exponential. Thus, standardization and interchangeability of transducers and their associated electronics are not practical.

Similar calibration and linearization limitations occur with the hot wire type of constant current system. Further, the high operating temperature required to obtain usable signal levels limits applications, sensor life, and sensor stability. Compensation over a broad temperature range is only slightly easier to obtain than with the thermistor type of constant current system.

Constant temperature techniques, of either the thermistor or hot wire type, suffer from the same general problems associated with the constant current systems. In addition, temperature compensation is limited by the difficulty of matching resistance/temperature characteristics of the compensation sensor to that of the flow sensor.

Applications using boundary layer techniques are distinctly limited due to the sensitivity to the differential temperature which exists between the transducer case and the fluid and to changes in the boundary layer characteristics due to pressure and temperature changes.

The present invention combines all the advantages of constant temperature operation with the accuracy and stability obtainable with thermistors due to their high signal level output and eliminates the shortcomings of thermistors in the prior art systems by making the transfer function virtually independent of variations in the thermistor's resistance/temperature curve. In point of fact, the technique described will work with any stable temperature variable device employed as a sensor. The temperature coefiecient may be positive or negative. Typical diverse devices are semi-conductors, metallic wires, and the like. The advantages of thermistors in most applications lies in their high sensitivity which minimizes the low level accuracy requirements imposed on the electronic signal conditioning apparatus.

The basic relationship for flow measurement using a sensor heated to a constant temperature ($Ts$) is:

$$P = (A + B m^{1/n}) (Ts - Ta)$$

where:
 $P$ = power to sensor
 $A$ = an empirically determined constant for zero flow (dependent on sensor size and specific fluid properties)
 $B$ = an empirically determined constant for other then zero flow (also dependent on sensor size and specific fluid properties)
 $m$ = mass flow rate = $p V$.
 $n$ = an empirically determined constant dependent on physical size and shape of sensor, (typically 2.5 for thermistors used for mass flow rate measurements)
 $Ts$ = Sensor operating temperature
 $Ta$ = Fluid temperature Fluid temperature dependence may be eliminated by operating two different sensors at two different constant temperatures and taking the difference in the power dissipations as follows:

$$P_2 = (A + B m^{1/n}) (Ts_2 - Ta)$$

$$P_1 = (A + B m^{1/n}) (Ts_1 - Ta)$$

$$P_2 - P_1 = (A + B m^{1/n}) (Ts_2 - Ts_1)$$

$$\text{or } m = \left\{ \frac{\frac{P_2 - P_1}{Ts_2 - Ts_1} - A}{B} \right\}^n = \text{mass flow rate}$$

Since the sensors are operated at constant temperature, the resistance/temperature characteristics of the sensors do not appear in the transfer function. This is the derivation of "King's Law." For through treatment of King's Law, one may refer to: King, L. V. P., "On the Convection of Heat from Small Cylinders in a Stream of Fluid . . . ", *Proceedings of the Royal Society, (London), Volume* 214A, No. 14, 1914.

However, as a consequence of the previous noted problems, the accuracy which has heretofore been achieved by adhering to King's Law has been limited by the matching of the physical characteristics (mass, shape and surface area) of the two sensors and the placement of the sensors in the fluid stream such that they are exposed to the same fluid temperature and velocity simultaneously.

OBJECTS OF THE INVENTION

It is therefore a broad object of this invention to provide an improved means for measuring the mass flow rate of fluids.

It is another object of this invention to reduce errors due to fluid temperature changes and to expand the range over which thermal-type flowmeters may be compensated.

it is another object of this invention to eliminate the empirical characteristics of previous temperature compensation techniques.

It is a related object of this invention to effect a reduction in the time and effort required to calibrate and temperature compensate thermal-type mass flowmeters.

In another aspect, it is an object of this invention to provide unique calculating means for deriving mass flow rate and the ambient temperature of a fluid flowing within a conduit.

The manner in which these and other objects of the invention are achieved will be readily understood from a perusal of the following specification taken in conjunction with the subjoined claims and the drawing of which:

Figure 1:
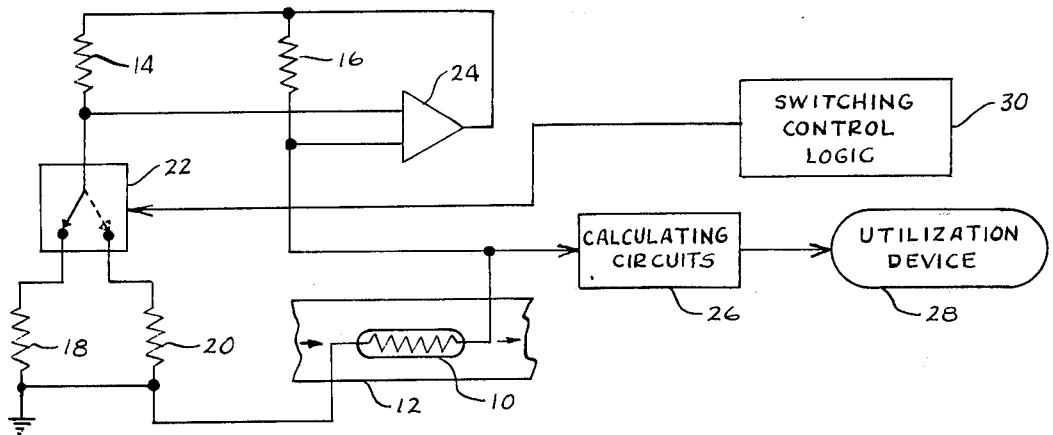
FIG. 1 is a general block diagram illustrating the basic technique of the invention.

Referring now to FIG. 1, a single temperature sensitive resistive device 10 is shown disposed within a conduit 12 through which a fluid, typically a gas, is flowing. The temperature sensitive resistive device 10 comprises on leg of a resistor bridge which further includes fixed resistors 14 and 16 and, in the fourth leg, either resistor 18 or resistor 20 according to the instantaneous position of an electronically driven switch 22. A differential amplifier 24 has its two inputs connected across the bridge and its output coupled back to the junction of resistors 14 and 16. It will thus be seen that the current supplied to the bridge is supplied by the differential amplifier 24, and the current quantity is dependent upon the degree of imbalance within the bridge. Those skilled in the art will recognize this configuration as a classical arrangement for operating the temperature sensitive resistive device 10 in the so-called "self heating" mode in which it remains at a "constant" temperature in excess of the temperture of the fluid flowing through the conduit 12. However, upon actuation of the switch 22, the alternate one of the resistors 18 and 20 will change the bridge ratios and cause the temperature sensitive resistive element 10 to quickly assume a different "constant" temperature.

The instantaneous voltage appearing at the junction between the resistor 16 and the temperature sensitive resistive element 10 (the significance of which will be developed below) is applied to calculating circuits 26, and the output from the calculating circuits 26 drives a utilization device 28. The utilization device 28 may be, by way of example, a digital or analog read-out, a storage means, or such other apparatus or combination thereof which may appropriately utilize the mass flow rate information.

The switch 22 alternately connects the resistor 14 to the resistor 18 or the resistor 20 under the influence of switching control logic 30 which drives the switch 22 at a rate of, for example, 10 cycles per second.

The temperature sensitive resistive element 10 is operated in the self-heating mode. That is, current flowing through the resistive element 10 is always sufficient to maintain it at a temperature above the temperature of the fluid which is flowing through the conduit 12. Those skilled in the art will understand that the power necessary to maintain the resistive element 10 at a given temperature bears a relationship, as noted above in the discussion of King's Law, to the mass flow rate of the fluid in the conduit. This maintenance power, in turn, is related, in accordance with Ohm's law, to the voltage appearing across the resistive element 10. Thus, as the switch 22 is operated, the voltage appearing at the junction of the resistor 16 and the resistive element 10 alternates between two levels which are representative of the two different power levels necessary to maintain the resistive element 10 alternately at the two different constant temperatures. The calculating circuits 26 respond to the two voltage observed at the junction between the resistor 16 and the resistive element 10, methodically sampled as a result of synchronization to the switch 22 being received from the switching control logic 30, in order to solve King's Equation to obtain a mass flow rate of the fluid passing through the conduit 12. These computations can be readily carried out by employing either analog or digital techniques or combinations of the two. The following discussion will be directed to a description of exemplary analog and digital systems by which the invention may be practiced.

Figure 2:
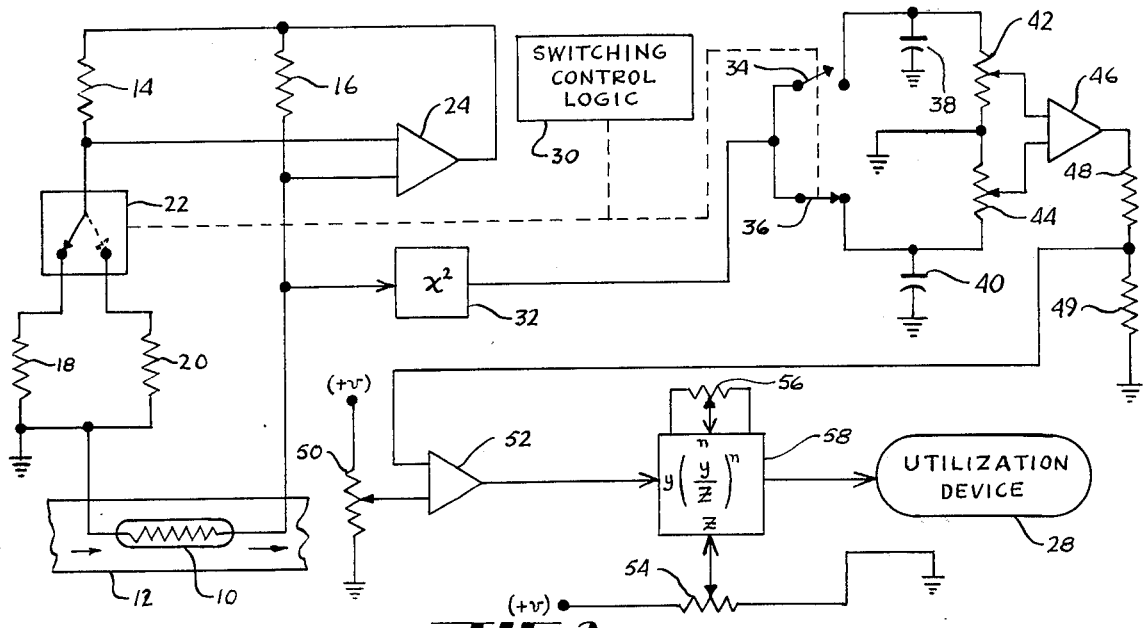
FIG. 2 is an intermediate logic block diagram of an analog system by which the invention may be practiced.

Referring now to FIG. 2, which is an intermediate block diagram of an analog system employing the present invention, it will be noted that the temperature sensitive resistive element 10, conduit 12, through which a fluid flows, the resistors 14, 16, 18, and 20, the electronically driven switch 22, the differential amplifier 24, and the switching control logic 30 all serve in precisely the same capacity as previously described in conjunction with FIG. 1. In addition, the switching control logic drives a pair of switches 34 and 36 which are alternatively opened and closed in mutually opposite positions.

The voltage observed at the junction between the resistor 16 and the resistive element 10 is passed through a squaring circuit 32, and the squared signal issuing from the circuit 32 is applied to input terminals of both the switches 34 and 36. The output terminal of the switch 34 is connected to one plate of a capacitor 38 which has its other plate connected to ground potential. Similarly, the output terminal from the switch 36 is connected to one plate of another holding capacitor 40 which also has its other plate connected to ground. Thus, depending upon the positions of the switches 34 and 36, the squared signal charges either the holding capacitor 38 or holding capacitor 40. In order to develop the difference of the powers necessary to maintain the two different "constant" temperature, it is necessary to divide each of the squared voltage signals held on the holding capacitors 38 and 40 by a factor which represents the resistance of the temperature sensitive resistive element 10 at each of the two constant temperatures at which it is operated. This division function is readily performed by variable resistors 42 and 44 which have taps at which the respective $E^2/R$ signals are available. The power signal corresponding to $P_2$ is applied to the positive input terminal of a differential amplifier 46. Similarly, the signal representing $P_1$ is applied to the negative or inverting input to differential amplifier 46 whereby the output signal of the differential amplifier 46 is representative of the quantity $(P_2 - P_1)$.

A voltage divider comprising resistors 48 and 49 is employed to insert the function $(1/Ts_2 - Ts_1)$. Thus, the signal obtained from the junction of the resistors 48 and 49 is $(P_2 - P_1/Ts_2 - Ts_1)$. This signal is applied to the non-inverting input of another differential amplifier 52. A variable resistor 50 is electrically connected between a source of positive potential and ground. The tap of the variable resistor 50 is connected to the negative or inverting input of the differential amplifier 52 in order to introduce the equation component (−A). Therefore, the signal appearing at the output of the differential amplifier 52 is $(P_2 - P_1/Ts_2 - Ts_1) - A$. This signal is applied to the Y input of a function generator 58 which operates to issue a signal defined as $(Y/Z)^n$. Another variable resistor 54 is connected between a source of positive potential and ground, and the tap signal of the variable resistor 54 is applied to the Z input of the function generator 58 in order to introduce the B component into the equation. The exponent ($n$) is entered into the equation from the tap of a variable resistor 56 disposed in an externally accessible feedback circuit of the function generator 58.

The output signal from the function generator 58 is the calculated value of the instantaneous mass flow rate of fluid through the conduit 12. This calculated mass flow rate may be employed according to the needs of a specific system by the utilization device 28.

Figure 3:
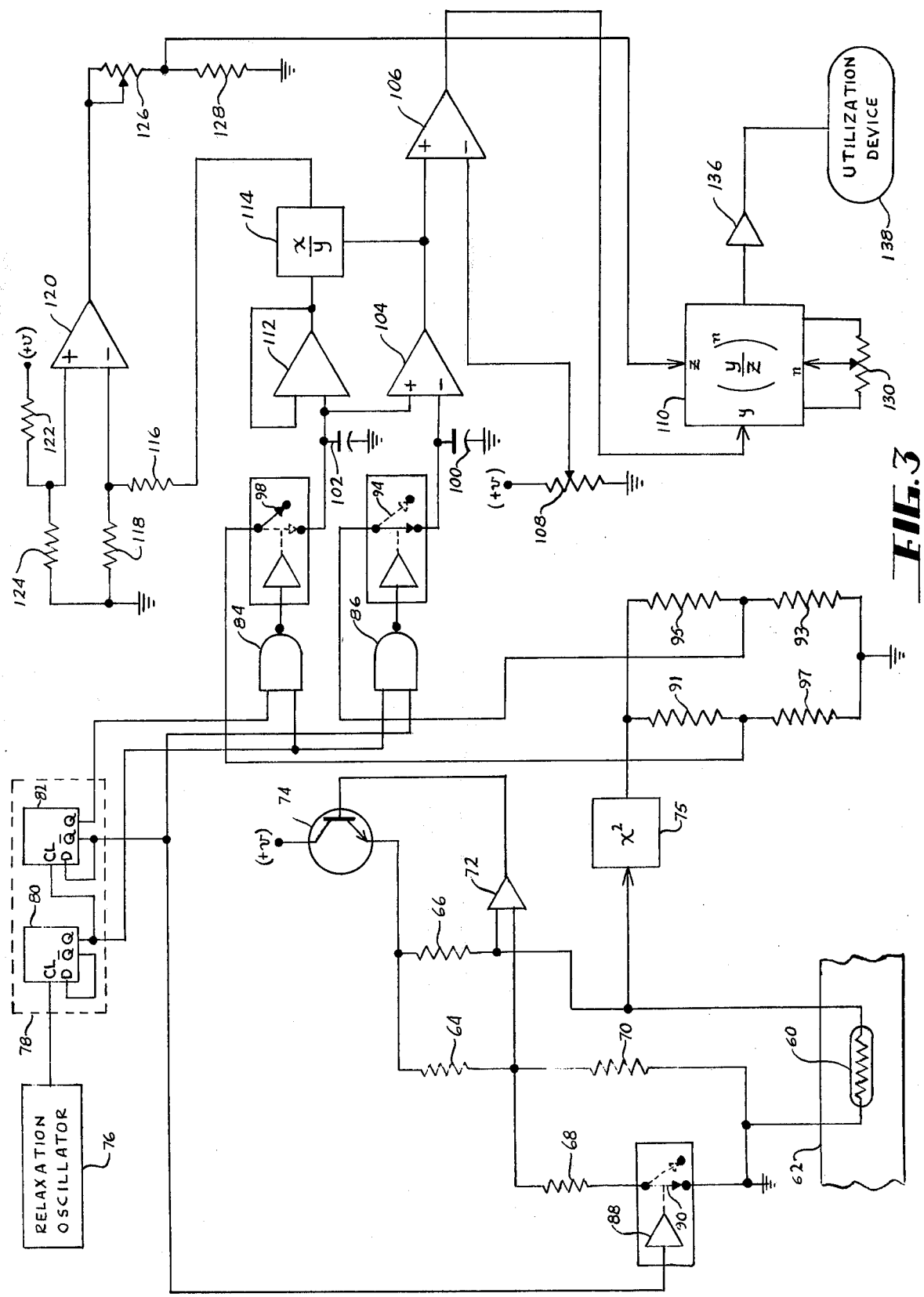
FIG. 3 is a detailed block diagram of one specific analog system employing the present invention.

FIG. 3 illustrates one detailed embodiment of an analog mass flow rate calculating system in accordance with the generalized analog system discussed in conjunction with FIG. 2. A thermistor 60 is disposed within a conduit 62 and is in engagement with a fluid, typically a gas, flowing through the conduit. The thermistor 60 constitutes one leg of a bridge which also includes the resistors 64, 66, and 70. A resistor 68 is alternately placed into and out of parallel with the resistor 70 in accordance with the instantaneous position of an electronically drive switch 90 as will be described in more detail below.

The bridge is operated to maintain the thermistor 60 in a self-heating mode at two different "constant" temperatures according to the position of switch 90. Differential amplifier 72 is connected across the bridge to sense any bridge imbalance causes by a tendency of the temperature of the thermistor 60 to shift (which would cause a corresponding shift in its resistance), which tendency is corrected by differential amplifier 72 issuing a signal which is applied to the base electrode of an NPN transistor 74. NPN transistor 74 supplies current for the bridge, and this current is adjusted as necessary to maintain the thermistor 60, alternately, at its two "constant" temperatures.

As previously noted, the voltage observed at the junction between the resistor 66 and the thermistor 60 may be squared to obtain a term which is proportional to the power necessary to maintain the thermistor at constant temperature. This squaring function is carried out by a squaring circuit 75 which issues an $E^2$ signal to the input terminals of electronically actuated switches 98 and 94.

Actuation of the electronic switches 90, 94 and 98 is controlled by a timing means comprising a relaxation oscillator 76 and a frequency divider 78. Relaxation oscillator 76 may be a simple uni-junction type operating at a frequency on the order of 40 hz. The frequency divider 78 comprises a pair of cascaded D-type flip-flops connected in the toggle configuration with the Q output tied back to the D input. The Q input from the first D-type flip flop 80 is connected to the clock input of the second D-type flip-flop 82. A NAND-gate 84 has its two inputs connected to the respective Q outputs of the two D-type flip-flops 80 and 82. Another NAND-gate 86 has its two inputs connected to the Q output of the D-type flip-flop 80 and a Q output of the D-type flip-flop 82. A switch driver 88 for the switch 90, which cuts the resistor 68 into and out of parallel relationship with the resistor 70, is driven directly from the Q output of the D-type flip-flop 82. The NAND-gate 84 issues an enabling signal to a switch driver 96 which controls the position of the switch 98. Similarly, the NAND-gate 86 issues an enabling signal to the switch driver 92, when both inputs are at logic zero level, to drive the switch 94.

With this timing arrangement, it will be seen that the switch 90 is open and closed for equal time periods at a rate of about 10 hz. During the second half of each half-cycle of the switch 90, either the switch 94 or the switch 98 will also be closed. The first half of each half-cycle of the switch 90 is therefore a "settling" time for the thermistor 60 to assume the appropriate "constant" temperature for that half cycle.

The output from the squaring circuit 75 is connected to two voltage divider circuits comprising, respectively, resistors 91 and 93 and resistors 95 and 97. The junction between the resistors 91 and 93 is connected to the input of switch 94. Similarly, the junction between resistors 95 and 97 is connected to the input of switch 98. The ratios between the resistors 91 and 93 and between the resistors 95 and 97 are selected to represent resistance of the thermistor 70 at its two respective "constant" temperatures whereby the signals applied to the inputs of the switches 94 and 98 are $E^2/R$ or power.

Thus, a signal representing the power necessary to maintain the thermistor 60 at a first temperature is sampled and held by the holding capacitor 100 while a signal representing the power necessary to hold the thermistor 60 at its second constant temperature is sampled and held by the holding capacitor 102.

The voltage held on the capacitor 102 is applied to the positive input of a differential amplifier 104, and the voltage held on the capacitor 100 is applied to the inverting input of the differential amplifier 104.

The output from the differential amplifier 104, which is the term $P_2 - P_1$, is applied to the positive input of another differential amplifier 106. A variable resistor 180, connected between a source of positive potential and ground, has its tap connected to the negative input to the differential amplifier 106 such that the output from the differential amplifier 106 is the quantity: $(P_2 - P_1/T_2 - T_1) - A$. This signal is applied to the Y input of function generator 110.

It will be noted that the voltage held on the capacitor 102 is also applied to a unity gain connected differential amplifier 112, which, in turn, drives the X input of a function generator 114 which generates the function X/Y. The Y input of the function generator 114 receives the output from the differential amplifier 104 such that the output signal from the function generator 114 is $P_2(dT/dP)$. This function is applied to the inverting input of a differential amplifier 120. Resistors 122 and 124 are connected in series between a reference voltage and ground, and the junction between the resistors 122 and 124 is connected to the positive input of differential amplifier 120. The resistence ratio between resistors 122 and 124 is selected so that the signal appearing at the positive input of differential amplifier 120 represents $Ts_2$. Thus, the output signal from the differential amplifier 120 is $T_2 - (P_2 dT/dP) = Ta$ which is the ambient temperature of the gas flowing in the conduit 62. This quantity can be displayed or otherwise utilized as may be useful in a given environment.

It has been determined that the factor B in the equation varies slightly and generally proportionally to the ambient temperature of the gas flowing in the conduit 62. Therefore, the output from differential amplifier 120 is also applied to a voltage divider comprising a variable resistor 126 and a fixed resistor 128. Variable resistor 126 is adjusted to provided a signal at the junction between the resistors 126 and 128 which is representative of the quantity B in the expected ambient temperature range of the gas flowing in the conduit 62. This signal is applied to the Z input of a function generator 110. A variable resistor 130 is disposed across the feedback circuit of function generator 110 to develop the exponent (n) input. A unity gain amplifier 136 is employed to drive the utilization device 138.

In the circuit of FIG. 3, the amplifiers 72, 104, 106, 112, 120, and 136 may be Burr-Brown 3521 or the equivalent. The function generators 75 and 114 may be Burr-Brown 4204 or the equivalent. The function generator 110 may be Burr-Brown 4301 or equivalent. Thermistors which may be employed as the sensor 60 are manufactured by Victory Engineering, Fenwal, and other manufacturers. The D-type flip-flops 80 and 82 may be type CD4013B, the NAND-gates 84 and 86 may be type CD4011B and the switches 90, 94, 98 and their corresponding drivers 88, 92, and 96 may be type AD75115D. Equivalent integrated and discrete circuits are readily available for substitution.

Figure 4:
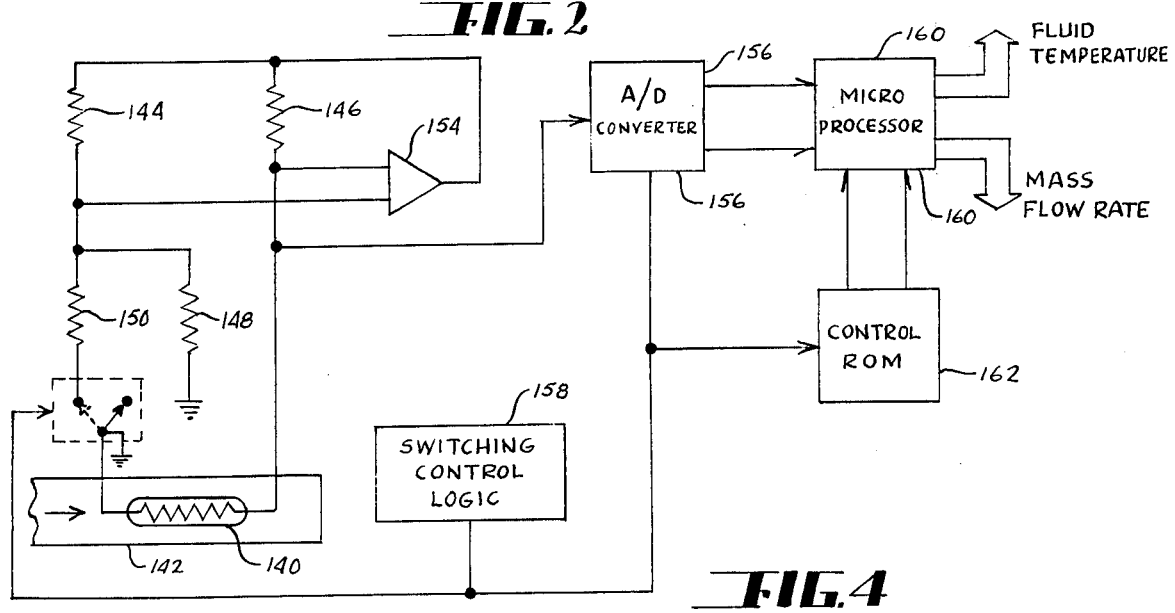
FIG. 4 is a major logic diagram illustrating the manner in which the present invention may be practiced employing digital techniques.

FIG. 4 illustrates a basic digital configuration by which the present invention may also be practiced. A temperature sensitive resistive element 140 is disposed in a conduit 142 in order to intercept a fluid flowing therethrough. The temperature sensitive resistive element 140 comprises one leg of a bridge further including the resistors 144 and 146 and another resistor 148 with which a resistor 150 is alternately thrown into and out of parallel according to the instantaneous position of an electronically actuated switch 152. A differential amplifier 154 is connected across the bridge, and its output is applied to the input of resistors 146 and 144 in order to maintain the temperature sensitive resistive element 140 in the self-heating region at two "constant" temperatures according to the position of the electronically actuated switch 152.

The switch 152 is driven, by switching control logic 158, at a rate of, for example, 10 cycles per second. Synchronization signals from the switching control logic 158 are also applied to an analog-to-digital converter 156 which samples the voltages observed at the junction between resistor 146 and the sensing element 140 and converts the instantaneous voltage to a digital value in synchronization with actuation of a switch 152. Typically, "settling" time is allowed for the element 140 to stabilize each half cycle before a voltage is converted to a digital output.

The digital output from the analog-to-digital convertor 156 is applied to the data inputs of a microprocessor 160. The microprocessor 160 utilizes this information to calculate the ambient fluid temperature and/or mass flow rate by simply running through the calculations involved which are stored in a program contained within a control read-only-memory 162 which also receives synchronizing information from switching control logic 158. It will be readily apparent to those skilled in the digital arts that the manner in which the voltage observed at the junction between the resistor 146 and the sensing element 140 are read and used in digital calculations to obtain fluid temperature in mass flow rate may take many forms.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. A method for measuring the mass flow rate of a fluid flowing in a conduit comprising the steps of:
   A. disposing a single temperature sensitive resistive element in heat transfer communication with the fluid
   B. causing the temperature sensitive resistive element to assume a first temperature ($Ts_1$) above that of the fluid by passing a current therethrough;
   C. determining the power ($P_1$) necessary to maintain the temperature sensitive resistive element at the first temperature;
   D. causing the temperature sensitive resistive element to assume a second temperature ($Ts_2$) above that of the fluid by passing a current therethrough;
   E. determining the power ($P_2$) necessary to maintain the temperature sensitive resistive element at the second temperature; and
   F. calculating the mass flow rate (m) by solving the equation:

$$\dot{m} = \left[ \frac{\frac{P_2 - P_1}{Ts_2 - Ts_1} - A}{B} \right]^n = \text{mass flow rate}$$

wherein:
A = an empirically determined constant for zero flow (dependent on size of temperature sensitive resistive element and specific fluid properties)
B = an empirically determined constant for other than zero flow (also dependent on size of temperature sensitive resistive element and specific fluid properties)
n = an empirically determined constant dependent on physical size and shape of temperature sensitive resistive element.

2. The method of claim 1 in which steps (B) and (D) are alternately repeated.

3. The method of claim 2 which further includes within each of steps (C) and (E) the first substep of squaring the voltage appearing across the temperature sensitive resistive device.

4. The method of claim 3 which further includes within each of steps (C) and (E) the second substeps of sampling and holding the squared voltages.

5. The method of claim 4 which includes the further steps of providing a first delay between steps (B) and the second substep of step (C) and providing a second delay between step (D) and the second substep of step (E).

6. Apparatus for measuring the mass flow rate of a fluid flowing in a conduit comprising:
   A. A temperature sensitive resistive element disposed in the conduit;
   B. current control means for causing said temperature sensitive resistive element to assume, alternately, first ($Ts_1$) and second ($Ts_2$) constant temperatures by controlling the current passing therethrough;

C. means for measuring a first power ($P_1$) necessary to maintain said temperature sensitive resistive element at the first constant temperature;

D. means for measuring a second power ($P_2$) necessary to maintain said temperature sensitive resistive element at the second constant temperature; and E. calculating means responsive to the values of the first and second constant temperatures and the values obtained in said first and second power measurements for computing the mass flow rate of the fluid by solving the equation:

$$\dot{m} = \left[ \frac{\frac{P_2 - P_1}{Ts_2 - Ts_1} - A}{B} \right]^n = \text{mass flow rate}$$

wherein:

A = an empirically determined constant for zero flow (dependent on size of temperature sensitive resistive element and specific fluid properties)

B = an empirically determined constant for other than zero flow (also dependent on size of temperature sensitive resistive element and specific fluid properties)

n = an empirically determined constant dependent on physical size and shape of temperature sensitive resistive element.

7. The apparatus of claim 17 in which each of said means for measuring the first and second powers includes:

A. means for sensing the voltage drop across said temperature sensitive resistive device; and B. squaring means for squaring the sensed voltage to obtain a value proportional to the power dissipated by the temperature sensitive resistive device.

8. The apparatus of claim 6 in which said current control means includes:

A. a resistance in-circuit with said temperature sensitive resistive element;

B. first switch means connected to switch said resistance from a first value to a second value in order to correspondingly switch said temperature sensitive resistive element between the first and second constant temperatures; and C. switching control means for alternately energizing and deenergizing said first switch means.

9. The apparatus of claim 8 which further includes:

A. means for sensing the voltage drop across said temperature sensitive resistive element;

B. squaring means for squaring the sensed voltage to obtain a value representative of the instantaneous power being dissipated by the temperature sensitive resistive element at an output terminal thereof;

C. a first sampling and holding means;

D. a second switch selectively coupling said output terminal of said squaring means to said first sampling and holding means;

E. a second sampling and holding means;

F. a third switch selectively coupling said output terminal of said squaring means to said second sampling and holding means;

G. logic means included in said switching control means for alternately opening and closing said second and third switches such that said second switch is closed when said temperature sensitive resistive element has assumed the first constant temperature and said third switch is closed when said temperature sensitive resistive element has assumed the second constant temperature whereby said first sampling and holding means is repeatedly refreshed to hold a value proportional to the power necessary to maintain said temperature sensitive element at the first constant temperature and said second sampling and holding means is repeatedly refreshed to hold a value proportional to the power necessary to maintain said temperature sensitive resistive element at the second constant temperature.

10. Apparatus for measuring the mass flow rate of a fluid flowing in a conduit comprising:

A. a temperature sensitive resistive element disposed in the conduit;

B. current control means for causing said temperature sensitive resistive element to assume, alternately, first ($Ts_1$) and second ($Ts_2$) constant temperatures by controlling the current passing therethrough the temperature sensitive resistance element assuming a resistance $Rs_1$ at the first constant temperature and a resistance $Rs_2$ at the second constant temperature;

C. means for sensing the voltage drop across said temperature sensitive resistive element at any instant of time; and D. digital calculating means responsive to the values of the first and second constant temperatures and the instantaneous voltage drops ($Es_1$ and $Es_2$) sensed across said temperature sensitive resistive element when said temperature sensitive resistive element has assumed each of said two constant temperatures, $Ts_1$ and $Ts_2$, respectively, for computing the mass flow rate of the fluid by the equation:

$$\dot{m} = \left[ \frac{1}{B} \left( \frac{\frac{Es_2^2}{Rs_2} - \frac{Es_1^2}{Rs_1}}{Ts_2 - Ts_1} - A \right) \right]^n$$

wherein:

A = an empirically determined constant for zero flow (dependent on size of temperature sensitive resistive element and specific fluid properties)

B = an empirically determined constant for other than zero flow (also dependent on size of temperature sensitive resistive element and specific fluid properties)

n = an empirically determined constant dependent on physical size and shape of temperature sensitive resistive element.

11. The apparatus of claim 10 in which said digital calculating means comprises:

A. an analog-to-digital converter having an input coupled to sense the instantaneous voltage appearing across said temperature sensitive resistive element and a multiple digit output for issuing a digital representation thereof;

B. digital storage means for storing the constants and steps for calculating fluid mass flow rate according to King's Equation; and C. a digital processing element adapted to receive the digital representation from said analog-to-digital converter and the constants and steps for calculating fluid mass flow rate according to said equation from said digital storage means and responding thereto to calculate the mass flow rate.

* * * * *

UNITED STATES PATENT AND TRADEMARK OFFICE
CERTIFICATE OF CORRECTION

PATENT NO. : 4,043,196
DATED : August 23, 1977
INVENTOR(S) : James H. Trageser

It is certified that error appears in the above-identified patent and that said Letters Patent are hereby corrected as shown below:

ABSTRACT, last line, change "with" to ---within---.

Column 1, line 24, change "temperature", first occurrence, to ---temperatures---.

Column 1, line 41, change "temperature" to ---temperatures---.

Column 2, line 7, change "m" to ---$\dot{m}$---.

Column 2, line 18, change "m" to ---$\dot{m}$---.

Column 2, line 29, change "m" to ---$\dot{m}$---.

Column 2, line 31, change "m" to ---$\dot{m}$---.

Column 2, line 33, change "m" to ---$\dot{m}$---.

UNITED STATES PATENT AND TRADEMARK OFFICE
CERTIFICATE OF CORRECTION

PATENT NO. : 4,043,196
DATED : August 23, 1977
INVENTOR(S) : James H. Trageser

It is certified that error appears in the above-identified patent and that said Letters Patent are hereby corrected as shown below:

Column 2, lines 41 and 42, change "temperature" to ---temperatures---.

Column 2, line 66, change "it" to ---It---.

Column 4, line 47, change "temperature" to ---temperatures---.

Column 9, line 29, change "17" to ---6---.

Signed and Sealed this

Thirteenth Day of December 1977

[SEAL]

Attest:

RUTH C. MASON
Attesting Officer

LUTRELLE F. PARKER
Acting Commissioner of Patents and Trademarks